July 11, 1950     H. E. SCHALL ET AL     2,515,137
VEGETABLE COOKER
Filed Jan. 15, 1946     2 Sheets-Sheet 1
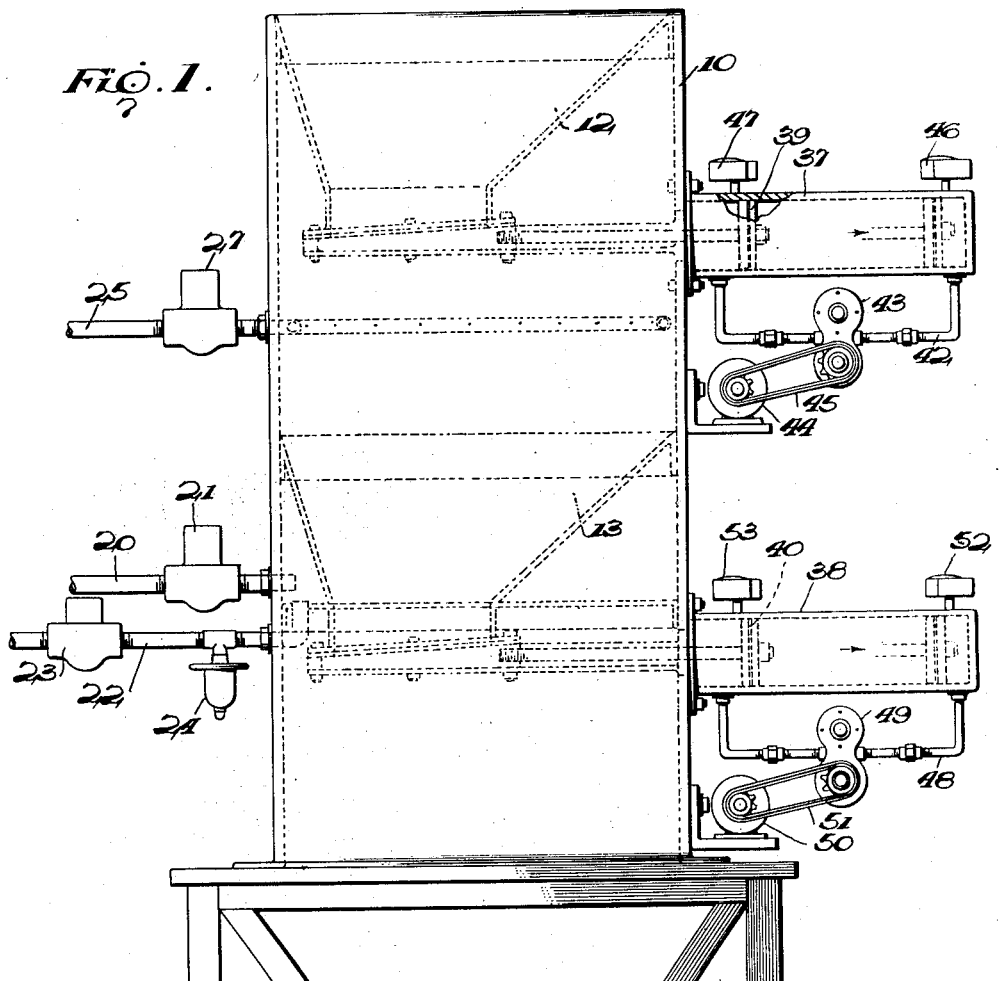
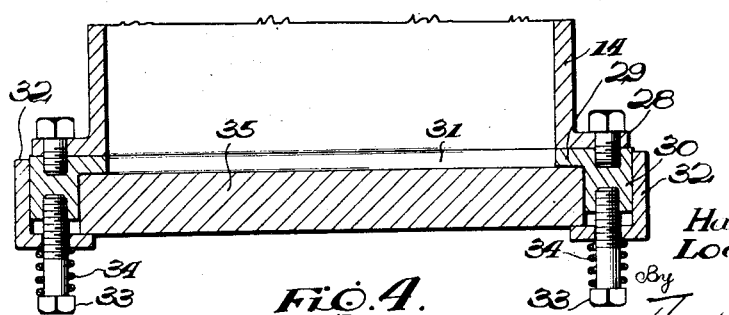
Inventors
Harold E. Schall
Loo R. London

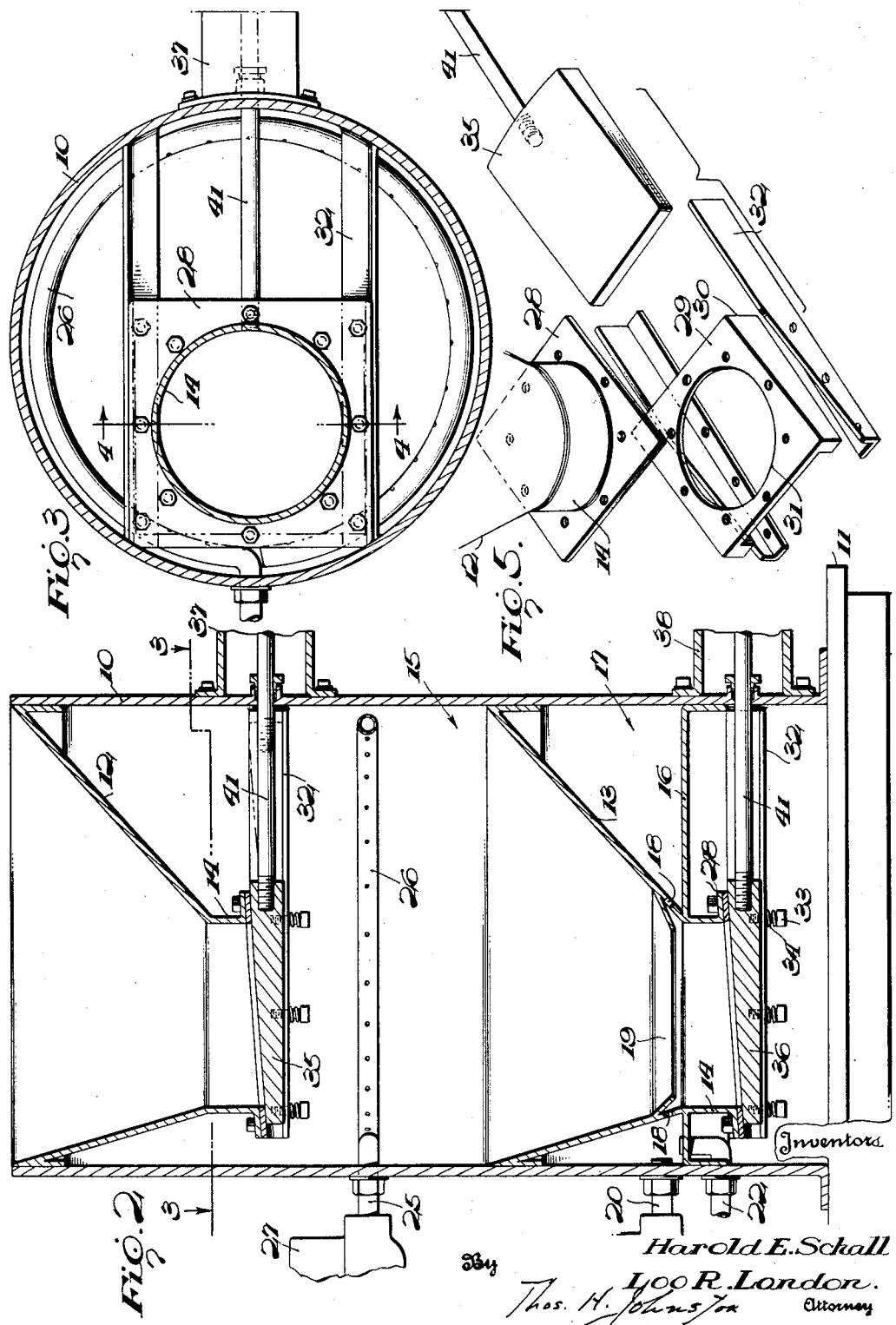

Patented July 11, 1950

2,515,137

UNITED STATES PATENT OFFICE 2,515,137

VEGETABLE COOKER

Harold E. Schall, Monte Vista, Colo., and Loo R. London, Burley, Idaho

Application January 15, 1946, Serial No. 641,334

3 Claims. (Cl. 99—324)

This invention relates to an improved steam cooker especially intended for cooking vegetables, such as potatoes, turnips, carrots and the like.

The objects of the invention are to provide a cooker suitable for use in conjunction with dehydration plants or canning factories and adapted for handling vegetables in large volume, wherein the cooker may be used for so-called pre-cooking purposes, namely, to cook the vegetables only long enough to loosen the skins, when the skins may be washed off, after which the vegetables may, if so desired, be fully cooked in the cooker, wherein the cooker may be operated automatically to thus effect a saving in labor, and wherein a novel valve mechanism will be provided for controlling the progress of the vegetables through the cooker.

Other and incidental objects of the invention will appear during the course of the following description, and in the drawings:

Figure 1 is a front elevation of our improved cooker.

Figure 2 is a vertical sectional view through the device.

Figure 3 is a horizontal section on the line 3—3 of Figure 2.

Figure 4 is a transverse section on the line 4—4 of Figure 3.

Figure 5 is a fragmentary perspective view particularly showing the major parts mounting the hopper valves.

In carrying the invention into effect, we employ a preferably cylindrical casing 10 which may be mounted upon a suitable stand or other supporting structure, as at 11, and is open at its ends. Fitting at its larger end within the upper end of the casing is a more or less cone-shaped upper receiving hopper 12, and fitting at its larger end within the casing below the hopper 12 is a similar lower cooking hopper 13. These hoppers may be secured to the casing in any appropriate manner and, as particularly shown in Figure 2, are provided at their smaller ends with aligned annular outlets 14 located eccentrically of the casing. Room within the casing is thus gained for the hopper valves employed, presently to be described.

As will be perceived, the hoppers 12 and 13 divide the casing 10 into a middle chamber 15, and suitably fixed within the lower end portion of the casing is a partition 16 which receives the outlet of the hopper 13 therethrough and defines a steam chamber 17 within the casing between the partition and the latter hopper. It is to be observed that the chamber 17 entirely surrounds the lower hopper so that steam in said chamber may uniformly heat the hopper. Formed in the wall of the hopper 13 just above the outlet thereof is a circular series of spaced steam passages 18 adapted to admit steam from the chamber 17 into the hopper 13, whence the steam will rise through any vegetables in said hopper into the middle chamber 15. Suitably fixed within the lower end portion of said hopper is an annular shield 19 which overlies the openings 18 in spaced relation thereto and is adapted to prevent clogging of said openings by vegetables in the hopper.

Leading through the wall of the casing 10 into the steam chamber 17 is a feed steam inlet pipe 20 connected with any suitable source of feed steam for supplying feed steam to said chamber, and interposed in said pipe is an electrically operated shut-off valve 21. Leading from said chamber at the bottom thereof is a steam outlet pipe 22 in which is interposed a like electrically operated shut-off valve 23, and connected with said pipe is a suitable trap 24 adapted to drain off water of condensation in the steam chamber. Entering through the wall of the casing 10 above the hopper 13 is a pipe 25 connected with any suitable source of water supply, and formed on or otherwise connected to the inner end of said pipe is a circular spray nozzle 26. Interposed in the pipe 25 is an electrically operated shut-off valve 27.

Formed on the lower ends of the outlets 14 of the hoppers 12 and 13, as particularly seen in Figures 4 and 5 of the drawings, are tilted rectangular flanges 28, and detachably bolted to said flanges are inclined valve seat plates 29 having thickened side flanges 30 tapered in height from front to rear so that the lower edges of said side flanges are horizontal. Formed in the seat plates to register with the outlets 14 are openings 31, and fitting the flanges 30 are angle-shaped tracks 32. Slidably fitting through the bottom flanges of said tracks are bolts 33 screwed into the flanges 30 at their lower edges, and surrounding said bolts are springs 34 pressing the tracks upwardly toward the seat plates.

Slidably supported by the tracks 32 are more or less wedge-shaped upper and lower valves, indicated for convenience of description at 35 and 36 respectively. These valves are snugly received between the side flanges 30 of the inclined seat plates 29 and are provided with flat lower faces to coact with the tracks and inclined upper faces adapted to seat flat against the seat plates when the valves are closed. In such position of the valves, the springs 34 will act on the tracks 32 to resiliently hold the valves seated in closed position and will prevent sticking thereof.

Bolted or otherwise fixed to the casing 10 are upper and lower cylinders 37 and 38 respectively, and slidable in said cylinders are pistons 39 and 40 respectively, the piston rods 41 of which extend into the casing and are screwed into the valves 35 and 36 respectively. Connected with the ends of the cylinder 37 at its lower side is a pipe 42 in which is interposed a suitable fluid pump 43, and appropriately mounted upon the casing is a suitable reversible electric motor 44 connected with the pump by a belt 45 for driving the pump. Communicating with the ends of the cylinder at its upper side are suitable switches 46 and 47 adapted to be pressure operated to open position and electrically operated to closed position.

The cylinder 37, pipe 42, and pump 43 are filled with a suitable liquid adapted to be transferred from either end of the cylinder to the other end thereof by the pump, and the switches 46 and 47 are appropriately connected electrically with the motor 44. Thus, assuming that the valve 35 is closed and the switch 46 is electrically operated to closed position, the motor 44 will be operated in one direction for driving the pump in a corresponding direction to transfer the fluid from the outer end of the cylinder to the inner end thereof in front of the piston 39 and shift the piston outwardly in the cylinder. Outward movement of the piston 39 will then continue until the piston nears the outer end of its stroke, when the fluid pressure in the outer end of the cylinder will open the switch 46 and thereby stop the motor 44. Thus, the valve 35 will be shifted outwardly to open position.

An operation similar to that just described will take place when the valve 35 is open and the switch 47 is electrically operated to closed position. In such instance, the motor 44 and pump 43 will be operated in a direction opposite to that first described, so that fluid will be transferred from the inner end of the cylinder 37 to the outer end thereof behind the piston 39 for shifting the piston inwardly. Inward movement of the piston will then continue until the fluid pressure in the inner end of the cylinder opens the switch 47 and thereby stops the motor 44. The valve 35 will thus be shifted inwardly to closed position. It has been deemed unnecessary to show the construction of the switches 46 and 47 as the parts are conventional. For a like reason, the circuit connections between the switches 46 and 47 and the motor 44 are not shown.

Equipment identical with that just described in connection with the cylinder 37 for opening and closing the valve 35 is also provided in conjunction with the cylinder 38 for opening and closing the valve 36. The operation is likewise identical and it is therefore unnecessary to go into detail. The pipe connecting the ends of the cylinder 38 is indicated at 48, the pump at 49, motor at 50, belt at 51, and switches at 52 and 53 respectively.

The valves 21, 23, and 27, like the switches 46, 47, 52 and 53, are conventional and therefore have not been shown in detail. However, all of these parts will preferably be electrically connected by suitable wiring with an appropriate master switch, not shown, which switch may be of conventional character and operated by a motor or other means to effect a continuous and automatic repetition of the cycle of operation of the cooker, which cycle will now be described.

Assuming the cooker to be empty and both the valves 35 and 36 closed, the vegetables to be cooked are introduced into the hopper 12. The valve 35 is then opened to permit the vegetables to fall into the hopper 13, after which the valve 35 is closed. The valve 21 is then opened to admit steam to the chamber 17, whereupon the steam will enter through the passages 18 and rise through the vegetables in the hopper 13 into the middle chamber 15. After the vegetables have been cooked a desired length of time, the valve 21 is closed, when the valve 23 is opened to exhaust the steam from the steam chamber 17 as well as from the middle chamber 15, after which the valve 23 is closed. The valve 36 is then opened to permit the vegetables to drop from the hopper 13, preferably into a bath of cold water, when the valve 27 is opened to admit water through the nozzle 26 for washing out the cooker. The valve 27 is then closed, when the valve 36 is closed to complete the cycle.

Having thus described our invention, we claim:

1. A vegetable cooker including a casing open at its ends, a tapered receiving hopper fitting at its larger end in the upper end of the casing closing the same, a tapered cooking hopper fitting at its larger end within the casing below the receiving hopper and dividing the casing into a middle chamber between the hoppers, valves carried by the smaller ends of the hoppers and adapted to close the same sealing said middle chamber, and means for admitting steam to said chamber.

2. A vegetable cooker including a casing, spaced upper and lower hoppers mounted therein and defining a middle chamber between said hoppers, valves carried by the hoppers and adapted to close the same sealing said middle chamber, a partition fixed within the casing and defining a steam chamber surrounding the lower hopper, the lower hopper being provided with spaced steam passages therein for admitting steam from said steam chamber through said lower hopper into the middle chamber, a shield fixed within the lower hopper and overlying said passages in spaced relation thereto to prevent clogging of said passages by vegetables in said lower hopper, and means for admitting steam to said steam chamber.

3. A vegetable cooker including a casing, a tapered receiving hopper fitting at its larger end in the upper end of the casing closing the same, a tapered cooking hopper fitting at its larger end within the casing below the receiving hopper and dividing the casing into a middle chamber between the hoppers, valves carried by the smaller ends of the hoppers and adapted to close the same sealing said middle chamber, a partition fixed within the casing and receiving the lower end of the cooking hopper therethrough, said partition defining a steam chamber surrounding the upper end portion of the cooking hopper, means for admitting steam to said steam chamber, the wall of the cooking hopper being provided close above said partition with circumferentially spaced passages for admitting steam from said steam chamber into the cooking hopper to rise through a charge of vegetables therein into said middle chamber, and an annular shield fixed in the cooking hopper to overhang said passages in spaced relation thereto and prevent obstruction of the passages by said vegetables.

HAROLD E. SCHALL.
LOO R. LONDON.

REFERENCES CITED

The following references are of record in the file of this patent:

UNITED STATES PATENTS

| Number | Name | Date |
| --- | --- | --- |
| 218,497 | Daniels | Aug. 12, 1879 |
| 349,288 | Vernon | Sept. 14, 1886 |
| 599,512 | Mayer | Feb. 22, 1898 |
| 1,551,128 | Williams | Aug. 25, 1925 |
| 1,975,560 | Sollich | Oct. 2, 1934 |
| 2,123,663 | Roach | July 12, 1938 |
| 2,250,858 | Ducat | July 29, 1941 |
| 2,407,482 | Doyle | Sept. 10, 1946 |